H. EWOLDT.
BAND CUTTER AND FEEDER.
APPLICATION FILED JAN. 17, 1911.
1,006,071.
Patented Oct. 17, 1911.
2 SHEETS—SHEET 1.
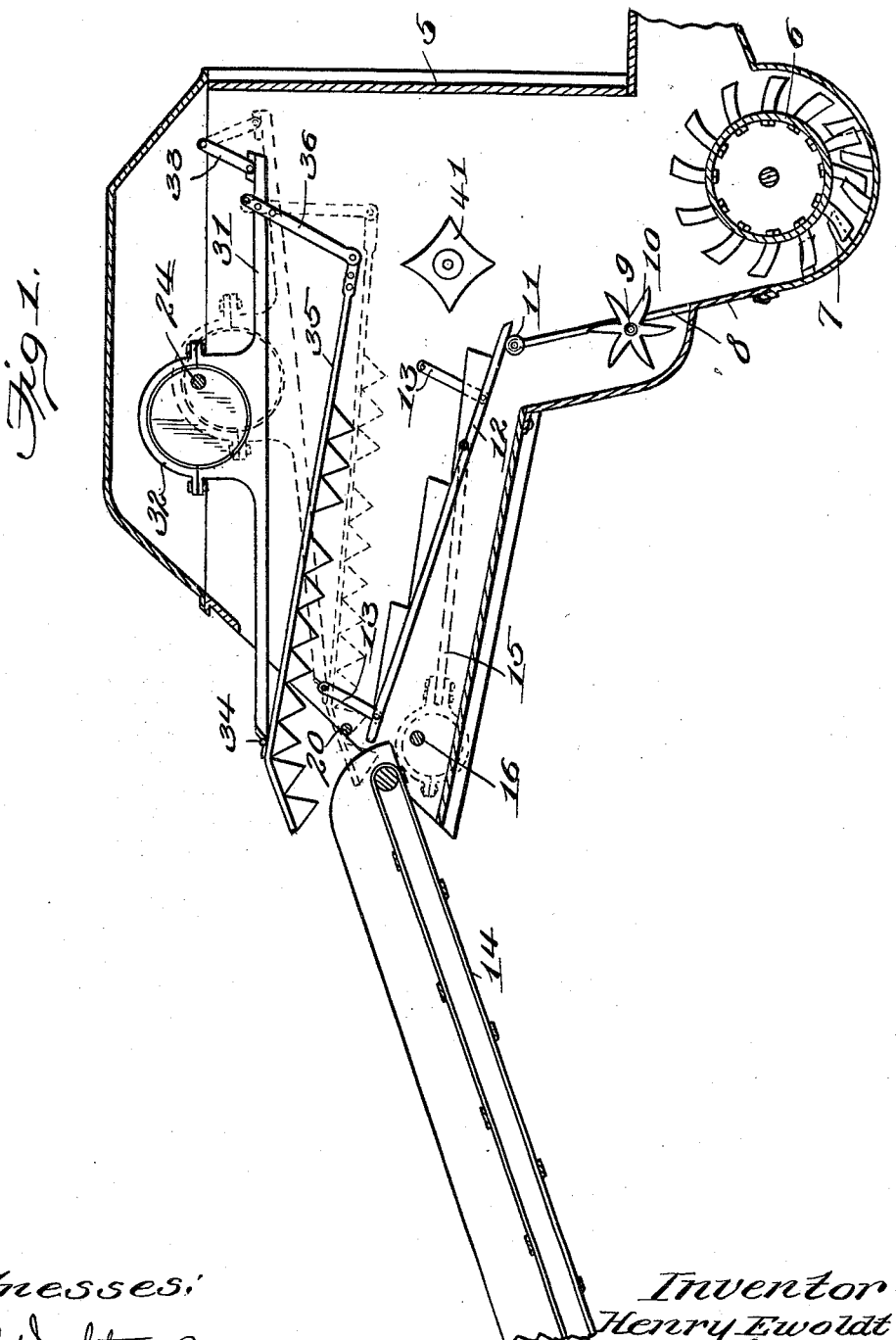
Witnesses:
A R Walton
M. K. Wilson
Inventor
Henry Ewoldt
by
Attys H. EWOLDT.
BAND CUTTER AND FEEDER.
APPLICATION FILED JAN. 17, 1911.
1,006,071.
Patented Oct. 17, 1911.
2 SHEETS—SHEET 2.
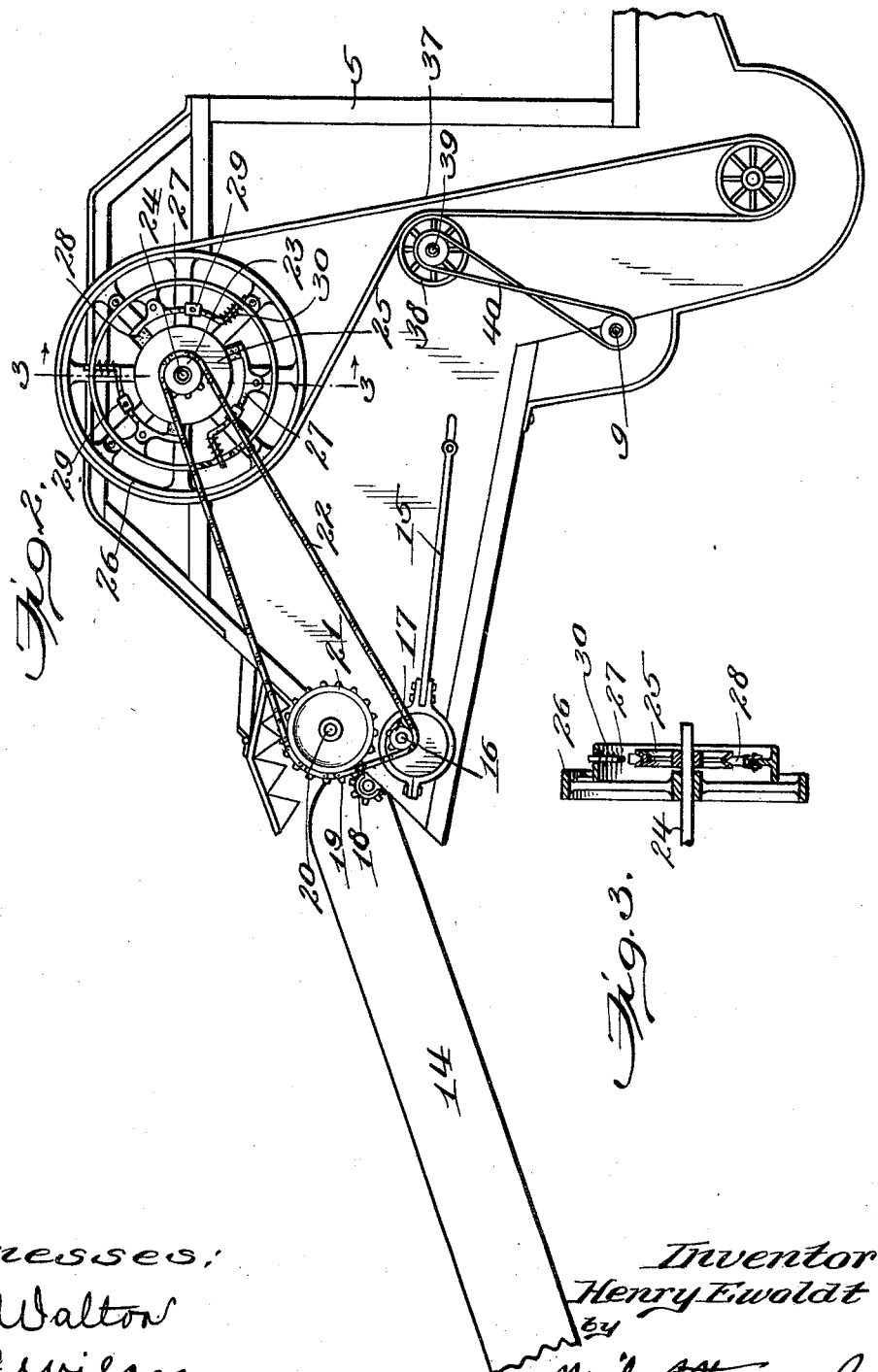
Witnesses:
A. R. Walton
M. R. Wilson
Inventor
Henry Ewoldt
by
Attys

UNITED STATES PATENT OFFICE.

HENRY EWOLDT, OF GRAND ISLAND, NEBRASKA.

BAND-CUTTER AND FEEDER.

1,006,071. Specification of Letters Patent. Patented Oct. 17, 1911.

Application filed January 17, 1911. Serial No. 603,154.

*To all whom it may concern:*

Be it known that I, HENRY EWOLDT, a citizen of the United States, residing at Grand Island, in the county of Hall and State of Nebraska, have invented certain new and useful Improvements in Band-Cutters and Feeders, of which the following is a specification.

My present invention relates particularly to band cutters and feeders for threshing machines, my object being to provide certain novel and useful improvements with respect to the structure of such devices, whereby to promote efficiency.

In the accompanying drawings, which show the details of my invention, Figure 1 is a longitudinal section. Fig. 2 is a side elevation, and, Fig. 3 is a detail of the governor or clutch wheel.

Referring to these figures, the frame 5 supports the usual threshing cylinder 6 and its concave 7, the latter having an upwardly projecting portion 8 (see Fig. 1) extending past the retarder shaft 9, carrying wheels 10, and provided at its upper end with rollers 11 on which the adjacent end of the feed pan 12 moves. This feed pan 12 is swingingly mounted, by means of suspended links 13 in the frame 5, between the before mentioned portion 8 of the cylinder concave, and the upper end of the feed belt or bundle carrier 14, and is given movement by means of an arm 15 eccentrically connected to a shaft 16 having a sprocket wheel 17 upon its end. The upper roller of the carrier 14 has a gear wheel 18 engaging a gear wheel 19 on a shaft 20 which has a sprocket wheel 21 above sprocket wheel 17.

About the sprocket wheels 17 and 21 is trained a sprocket chain 22, extending from the sprocket wheel 23 of the main shaft 24 which carries a tight wheel 25 and on which is mounted loosely, the governor wheel 26. This governor wheel 26 is provided with an outstanding circular flange 26ª carrying intermediately pivoted clutch arms 27 having shoes 28 at one end to engage the shaft wheel 25, and provided at their opposite ends with weights 29 and springs 30 acting in opposition to said weights. As soon as the wheel 26, which is driven from a suitable source of power, attains the required speed, the weighted ends of arms 27 move outwardly, and cause shoes 28 to engage the shaft wheel 25 and thus rotate shaft 24. In like manner when rotation of wheel 26 decreases, springs 30 force the shoes 28 away from the shaft wheel, serving to stop rotation of shaft 24 and in this manner to check the feed before rotation of the threshing cylinder 6 ceases as will be hereinafter described.

The frame 31 of the band cutter, has a boxing 32 eccentrically mounted upon the main shaft 24 and is suspended at one end by means of a swinging link 33. Adjacent the opposite end of this frame 31, at 34 are pivoted the knife bars 35, at the opposite ends of which are pivoted adjusting bars 26 adapted to be adjustably connected to the frame 31 adjacent link 33. The eccentric boxing imparts an oscillatory movement to the band cutter when the shaft 24 is in motion.

The governor wheel is connected, by a belt 37 to the threshing cylinder 6, which belt passes over the wheel 38 at the end of a shaft 39 arranged in a vertical line above the retarder shaft 9 and connected thereto by a belt 40. On shaft 39 is arranged a tight roller 41 which is squared, and the sides of which are concaved as shown, the function of this roller being to beat the straw and grain and hold the same down straight toward the threshing cylinder.

It will be noted that the feed board 8 extends at an acute inclination toward the cylinder 6, and that the retarder 10 is located at substantially the same level as the top of the cylinder. The beater 41 is located slightly in advance of the discharge end of the feed pan 12 and also above the same, in close proximity thereto. The purpose of this arrangement of parts is to prevent the straw from choking the cylinder. The beater holds the bundles down as they leave the band cutter knives and the feed pan, and they drop down toward the cylinder, and before reaching the same the straw is thoroughly thinned out by the retarder.

I claim:

In a threshing machine, a feed board extending at an acute inclination toward the cylinder, a retarder projecting through the feed board, a reciprocating feed pan having its discharge end supported on the upper end of the feed board, a beater located in advance of the discharge end of the feed pan and above the same, in close proximity thereto, and a band cutter located above the feed pan.

In testimony whereof I affix my signature in presence of two witnesses.

HENRY EWOLDT.

Witnesses:
BERNHARD EWOLDT.
ARTHUR EWOLDT.

Copies of this patent may be obtained for five cents each, by addressing the "Commissioner of Patents, Washington, D. C."